US007653188B2

(12) United States Patent
Kloberdans et al.

(10) Patent No.: US 7,653,188 B2
(45) Date of Patent: Jan. 26, 2010

(54) TELEPHONY EXTENSION ATTACK DETECTION, RECORDING, AND INTELLIGENT PREVENTION

(75) Inventors: Michael James Kloberdans, Brighton, CO (US); John Michael Walton, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 829 days.

(21) Appl. No.: 11/243,753

(22) Filed: Oct. 4, 2005

(65) Prior Publication Data

US 2007/0036314 A1 Feb. 15, 2007

Related U.S. Application Data

(60) Provisional application No. 60/701,222, filed on Jul. 20, 2005.

(51) Int. Cl.
*H04M 3/00* (2006.01)
*H04M 15/00* (2006.01)
*H04M 17/00* (2006.01)

(52) U.S. Cl. ................... 379/145; 379/114.14; 379/189; 370/356

(58) Field of Classification Search ............ 379/114.14, 379/143, 145, 188–189, 191–192, 198; 707/200; 370/356–360; 726/23; 709/224
See application file for complete search history.

(56) References Cited

U.S. PATENT DOCUMENTS 6,917,940 B1 * 7/2005 Chen et al. .................... 707/10

| | | | |
|---|---|---|---|
| 7,497,374 B2 * | 3/2009 | Helsper et al. | 235/380 |
| 2004/0102922 A1 * | 5/2004 | Tracy et al. | 702/181 |
| 2004/0117478 A1 * | 6/2004 | Triulzi et al. | 709/224 |

(Continued)

FOREIGN PATENT DOCUMENTS

JP 2001-034553 2/2001

(Continued)

OTHER PUBLICATIONS

Official Action for Canadian Patent Application No. 2,550,788, mailed Sep. 26, 2008.

(Continued)

*Primary Examiner*—Binh K Tieu
(74) *Attorney, Agent, or Firm*—Sheridan Ross P.C.

(57) ABSTRACT

A system and method are provided for detecting extension attacks made to a communication enterprise, and taking appropriate remedial action to prevent ongoing attacks and future attacks. One or more attributes of a suspect call are analyzed, and a risk is associated with each analyzed attribute. An overall risk or assessment is then made of the analyzed attributes, attack attributes are logged, and one or more remedial actions may be triggered as a result of the analyzed call attributes. The remedial actions may include recording the call, notifying an administrator of a suspect call, or isolating the communication enterprise from the attack by terminating the call or shutting down selected communication endpoints to prevent calls being made to those extensions. Rules may be applied to the analyzed attributes in order to trigger the appropriate remedial action. The call attributes analyzed may include call destination, call direction, call type, time of day of the call, call duration, whether a call source is spoofed, call volume from a particular call source, and hash values created for a suspect media stream.

29 Claims, 5 Drawing Sheets

U.S. PATENT DOCUMENTS

| | | | |
|---|---|---|---|
| 2004/0249866 A1* | 12/2004 | Chen et al. | 707/200 |
| 2005/0235360 A1* | 10/2005 | Pearson | 726/23 |
| 2007/0127448 A1* | 6/2007 | Buntin et al. | 370/356 |

FOREIGN PATENT DOCUMENTS

| | | |
|---|---|---|
| JP | 2004-038517 | 2/2004 |
| JP | 2004-086880 | 3/2004 |
| JP | 2004-140524 | 5/2004 |
| JP | 2004-147223 | 5/2004 |
| JP | 2004-320330 | 11/2004 |
| JP | 2005-157650 | 6/2005 |
| KR | 2001-0101174 | 11/2001 |

OTHER PUBLICATIONS

Examiner's Office Letter (including translation) for Japanese Patent Application No. 2006-197538, mailed Sep. 17, 2008.

Garreston "VoIP security threats: Fact or fiction?", Network World, available at http://www.networkworld.com/news/2005/072505-voip-security.html?nl&code=nlciscoalert3716, Jul. 25, 3005, pp. 1-3.

Reid "Voice Spam Spam, Spamity Spam", Qovia, Inc., White Paper, available at http://www.qovia.com/resources/pdfs/white%20papers/qovia_spit_wpaper.doc, website updated Apr. 25, 2005, pp. 1-4.

Lawson "Industry group sets out to make VoIP secure", IDG News Service, available at http://www.networkworld.com/news/2005/0329indusgroup.html, Mar. 29, 2005, pp. 1-2.

Greene "Many minds, one goal: Curb bad traffic", Network World, available at http://www.networkworld.com/news/2005/071105-sruti.html?page=1, Jul. 11, 2005, pp. 1-3.

Notice Of Preliminary Rejection (including translation) for Korean Patent Application No. 2006-0067585, mailed Apr. 17, 2008.

Powell, et al.; "Local Area Detection of Incoming War Dial Activity"; http://www.ouah.org/war_dial_detection.pdf; 13 pages.

Collier; "Enterprise Telecom Security Solutions"; http://download.securelogix.com/library/Enterprise_Telecom_Security_Solutions_Draft_10-12-04.pdf; 20 pages.

Sandstorm Enterprises, Inc.; "Sandtrap User Manual"; Jul. 29, 2002; 40 pages.

Sandstorm Enterprises, Inc.; "Sandtrap Brochure"; 2 pages.

SecureLogix; "ETM Product Brochure"; 12 pages.

Securelogix; "Voice Firewall Slick"; 2 pages.

Securelogix; "Voice IPS Slick"; 2 pages.

Lucid Security; "ipANGEL Online Brochure"; 1 page.

Sandstorm Enterprises; "Sandstorm's 'Wardialer Detector'"; http://www.sandstorm.net/products/sandtrap/; 3 pages.

Securelogix; http://www.securelogix.com/; various website printouts; 6 pages.

Translation of Notification of the First Office Action for Chinese Patent Application No. 200610105597.1, mailed May 8, 2009.

Examiner's Office Letter (including translation) for Japanese Patent Application No. 2006-197538, mailed Sep. 7, 2009.

* cited by examiner

TELEPHONY EXTENSION ATTACK DETECTION, RECORDING, AND INTELLIGENT PREVENTION

CROSS-REFERENCE TO RELATED APPLICATION

This Application claims the priority of U.S. Provisional Application No. 60/701,222 filed on Jul. 20, 2005, the entire disclosure of which is hereby incorporated by reference.

FIELD OF THE INVENTION

The present invention is related to protecting a communications system from extension attacks, and more particularly, the present invention relates to a method and system for detecting extension attacks, and taking appropriate remedial actions to prevent ongoing attacks and attacks from occurring in the future.

BACKGROUND OF THE INVENTION

Communication security is an increasing concern for most business and governmental organizations. With the advent of IP telephony and other uses of the Internet, organizations now have a number of means to communicate; however, this increased communications capability has also resulted in vulnerability to the organizations by hackers who wish to gain access to the organization's communication system. Most telephony extension attacks occur for the purpose of providing unsolicited messages to an organization, for example, to advertise various goods and services. However, many extension attacks may be initiated for clearly illegal purposes, for example, to gain access to confidential organizational information.

There are a number of different types of telephony extension attacks that can be initiated. For IP telephony, SPAM over Internet Telephony (SPIT) comprises unsolicited bulk messages broadcast over IP telephony devices. SPIT is a close relative of email SPAM and SPIM (SPAM over Instant Messaging). Although SPIT is not as prevalent as SPAM, the telecommunications industry expects that SPIT will become much more of a problem as time progresses. Other types of extension attacks include denial of service, war dialing, voice mail password brute forcing, extension password brute forcing, toll fraud, and others.

Some solutions exist for addressing telephony extension attacks. Currently available commercial products are primarily rule-based resulting in limited effectiveness, and are particularly ineffective for preventing attacks that utilize IP or caller ID spoofing to mask the source of the attack. Two known commercial products include the Voice Firewall and Voice Intrusion Prevention System by SecureLogix® and Sandtrap® by Sandstorm®.

While these products may be adequate for their intended purposes, there is still a need for a solution that can detect and prevent the new, more sophisticated attacks associated with voice over IP, such as SPIT. More particularly, there is a need for a telephony extension attack solution that can detect, record, alert, and effectively prevent attacks that occur over both traditional telephony (circuit switched) and IP telephony (packet switched) communication systems.

SUMMARY OF THE INVENTION

The present invention is directed to solving the above problems and disadvantages of the prior art. According to embodiments of the present invention, a method and system are provided for detecting telephony extension attacks, recording the attacks, alerting an administrator or others of the attack, and then providing remedial capabilities to stop an ongoing attack and to effectively prevent future attacks.

In accordance with a preferred embodiment of the present invention, the method and system of the present invention analyze multiple attributes of a call to determine whether the call may be a telephony extension attack. Once the attributes of a call are analyzed, a risk is associated with each attribute in terms of whether the call is likely to be an attack. Attributes of a call that can be analyzed include the call source, trunk ID, caller ID or IP address (if a VoIP call), call destination, one-way (source) media stream randomness, call duration, time of the call, call type, and call direction. Additionally, the number of calls received from a particular source (call volume) can also be defined as a call attribute and is a factor that is important to evaluate in determining a potential attack. If the risk assessment results in the finding of a perceived attack, the communications server or stand alone server that is monitoring incoming calls selectively logs the call attributes, records suspect events to include media streams, and alerts an administrator of the perceived attack.

Prevention of an ongoing attack and future attacks is achieved by incorporating one or more remedial actions based upon an assessment of the risks posed by a consideration of the call attributes. Remedial actions can be categorized in three primary forms, namely, manual, automatic, and automatically assisted remedial actions. Manual remedial actions include manual efforts to lock down the communication system or the affected part(s) of the system in order to prevent attacks. An example of a lockdown would be disconnecting a modem, or changing a class of restriction for receiving an incoming call, among others. An example of an automatic remedial action includes a prescribed set of rules applied to particular attributes of a call wherein if the attributes of a call meet the preset criteria of the rules, the communication system conducts an automatic lockdown of the entire system or the affected part(s) of the system to prevent the attack. The prescribed set of rules can be changed over time to accommodate fine-tuning of the system in response to a historical analysis of attacks that may have occurred in the past, thereby providing remedial actions at the appropriate level of threat risk. Attributes of suspect calls are logged, thereby provide a historical basis for determining an appropriate remedial action. An automatically assisted manual (AAM) remedial action is the selective blending of both manual and automatic methods together in order to provide an appropriate response to a perceived attack. The remedial actions are either more rule-based for the low risk attacks, or are more intelligent for the higher risk attacks by combining system suggestions with human influence. Prevention, through remedial measures, may be communicated to a user/administrator in many forms that include an email, a text message, or a cell phone call. Activation of these measures can be achieved by use of a user interface screen with menu selections, use of an Interactive Voice Response (IVR) application in the communications server/stand alone server, or by manual intervention to isolate the targeted communication devices.

Additional features and advantages of the present invention will become more apparent from the following discussion, particularly when taken together with the accompanying drawings.

DETAILED DESCRIPTION

Figure 1:
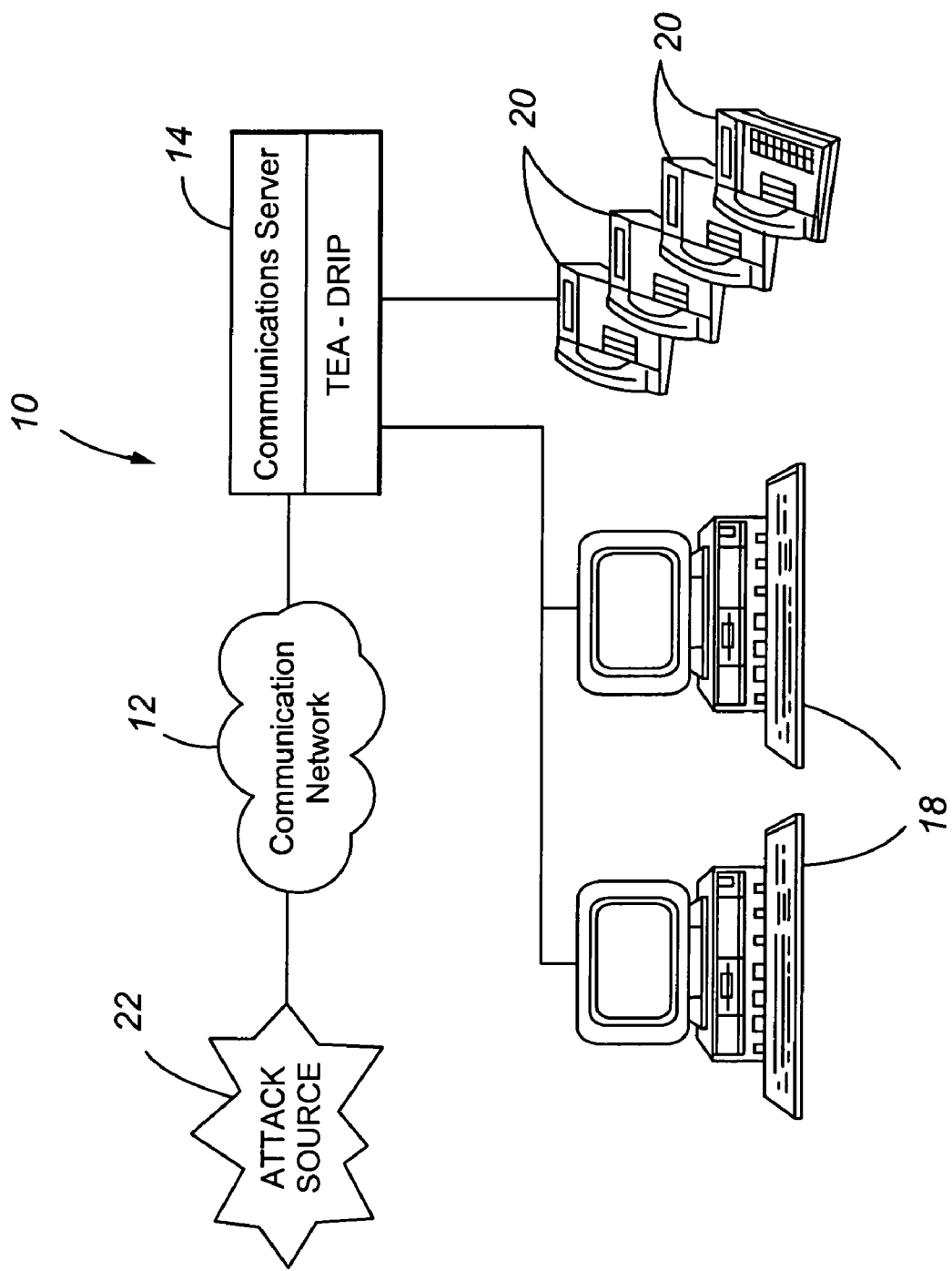
FIG. 1 is a schematic diagram depicting an exemplary telecommunication system incorporating the system and the method of the present invention in a first embodiment.

FIG. 1 illustrates a communication system 10 suitable for use in connection with a preferred embodiment of the present invention. The communication system 10 includes a communication network 12, a communication server or gateway 14, a first group or type of communication devices 18, and a second group or type of communication devices 20. The functionality that is achieved by the present invention is shown as being incorporated at the communication server 14, and is referred to as telephony extension attack with detection, recording and intelligent prevention (TEA-DRIP). The communication network 12 may comprise a public switched telephone network (PSTN) and/or may comprise a packet data network over which communications are transmitted in accordance with voice over Internet protocol (VoIP). The communication devices 18 and 20 may comprise any type of communication device suitable for use in connection with voice and data communications. For example, the communication devices 18 are generally illustrated as a computer and therefore may represent VoIP telephones, Fax machines, soft VoIP telephones, modems, and the like. Communication devices 20 are illustrated as being representative of traditional telephones and/or wireless voice communication devices such as cell phones, PDAs (Personal Digital Assistants), IP desk-sets and the like. It shall be understood that the communication server 14 may also represent a private branch exchange (PBX) or any other similar contact processing switch or server, the invention not being limited to use with any particular type of communication switch or server or configuration of similar system elements. The communication server 14 is dedicated to one or more communication enterprises, such as one or more business or governmental entities. The communication network 12 may further comprise one or more networks capable of carrying data, which may include real time data between the communication devices, or between a data packet source and one or more of the communication devices. The communication network 12 may also comprise a computer network, including a local area network, a private intranet, or the Internet.

An attack source 22 may include, for example, a data packet source under the control of a hacker that is sending a malicious stream of data packets with the intention of preventing a targeted communication device 18 or another associated device from performing its intended function. Thus, the attack source 22 may be associated with a denial of service (DoS) attack, as a specific type of an extension attack. The attack source could also be associated with SPIT (SPAM over Internet Telephony), SPAM, war dialing, voice mail password brute forcing, extension password brute forcing, toll fraud, and others. War dialing refers to attempts to hack into a communication system by use of a modem directed by a computer that sequentially or pseudo-randomly dials a number of extension numbers of an enterprise hoping to determine if there are modems, fax machines, voice mail or other communication devices associated with the extensions. War dialing software is available which allows hackers to record the result of each dialed extension. Those numbers/extensions that are answered by modem, fax, and voice mail are devices that are subject to a later attack, as opposed to those extension/numbers that generate no response when dialed. Voice mail password brute forcing and extension password brute forcing are similar to a war dialing attack except that the "brute forcing" terms connote that the hacker is attempting to hack into a specific device of the communication system. For example, the hacker dials a sequence of numbers to obtain a password to Voice mail on a specific phone extension. Voice mail may include proprietary and confidential organizational information, and unauthorized access to the voicemail obviously poses a risk to the organization. Toll fraud refers to attacks made by someone having access to the communication system of an enterprise, for example, an employee making unauthorized long distance telephone calls or other unauthorized use of the communications system.

Figure 2:
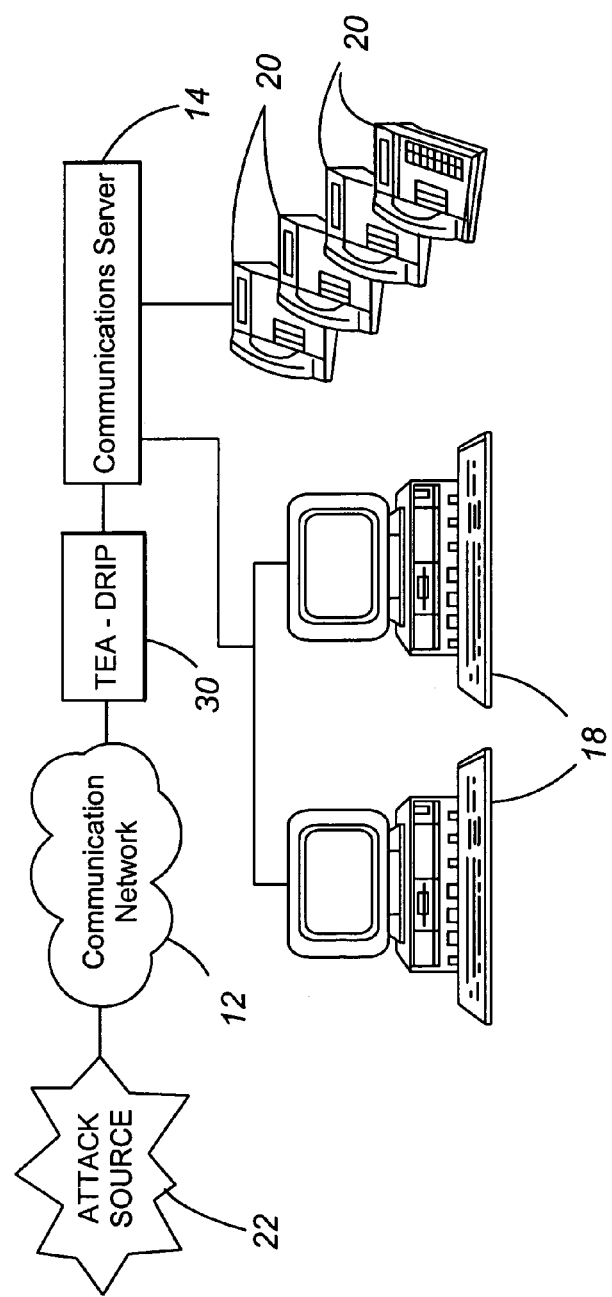
FIG. 2 is a schematic diagram depicting an exemplary telecommunication system and the system and method of the present invention in a second embodiment.
Figure 3:
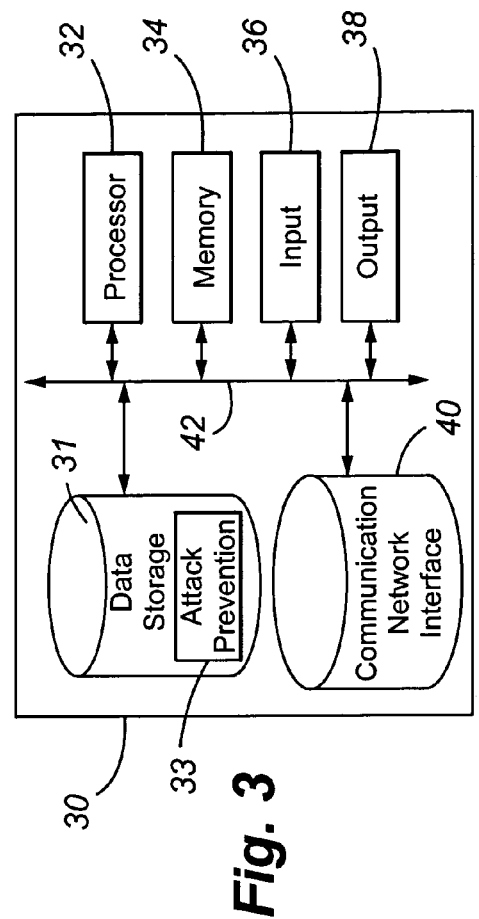
FIG. 3 is a schematic diagram of a communication device incorporating the present invention in the second embodiment.

Referring to FIG. 2 and FIG. 3, another embodiment of the present invention is illustrated with respect to an exemplary communication system. Specifically, the functionality achieved by the present invention is illustrated as being incorporated within a separate server or gateway 30 that communicates with the existing communication server 14 of a particular enterprise. As a stand-alone communication device 30, the server 30 can be described as generally including a processor 32, memory 34, an input device 36, an output device 38, a communication network interface 40, and data storage 31 in the form of one or more databases and/or one or more software/firmware applications. The applications may include a communication application and an attack prevention application as discussed more fully below. In addition, operating system programming may be stored in the data storage, as well as any other applications or data that is stored as part of the operation of the server 30. The functionality of the present invention in terms of executable programming instructions is depicted as the attack prevention application 33 in the data storage 31. The type of data storage may include magnetic storage devices, solid-state storage devices, optical storage devices, logic circuits, or any combination of such devices. It should further be appreciated that the applications/programs and data that may be maintained in the data storage 31 can comprise software, firmware or hard-wired logic. A communications bus 42 enables communication between the various components. The processor 32 may include any general-purpose programmable processor or controller for executing application programming or instructions. Alternatively, the processor may comprise a specifically configured application specific integrated circuit (ASIC). The processor 32 generally functions to run programming code implementing various functions performed and/or implemented by the server 30, to include the various detection, logging, recording, alerting and remedial action operations described herein. Each of these functions is collectively referred to as the attack prevention application 33. The memory 34 may be provided for use in connection with the execution of the programming, and for the temporary or long-term storage of data or program instructions. The memory 34 may comprise solid-state memory, such as DRAM and SDRAM. Where the processor 32 comprises a controller, the memory 34 may be integral to the processor. The server 30 may include one or more input devices 36 and one or more output devices 38. As can be appreciated by one of skill in the art, examples of input devices that may be provided include a numeric keypad, keyboard, pointing device, etc. As also can be appreciated by one of skill in the art, examples of output devices 38 may include a speaker, headphone, visual display, etc. A communication network interface 40 is provided for interconnecting the server 30 to the communication network 12. For example, the communication network interface 40 may comprise an Ethernet interface. The particular type of communication network to which the communication server 30 is interconnected generally determines the communication network interface.

Figure 4:
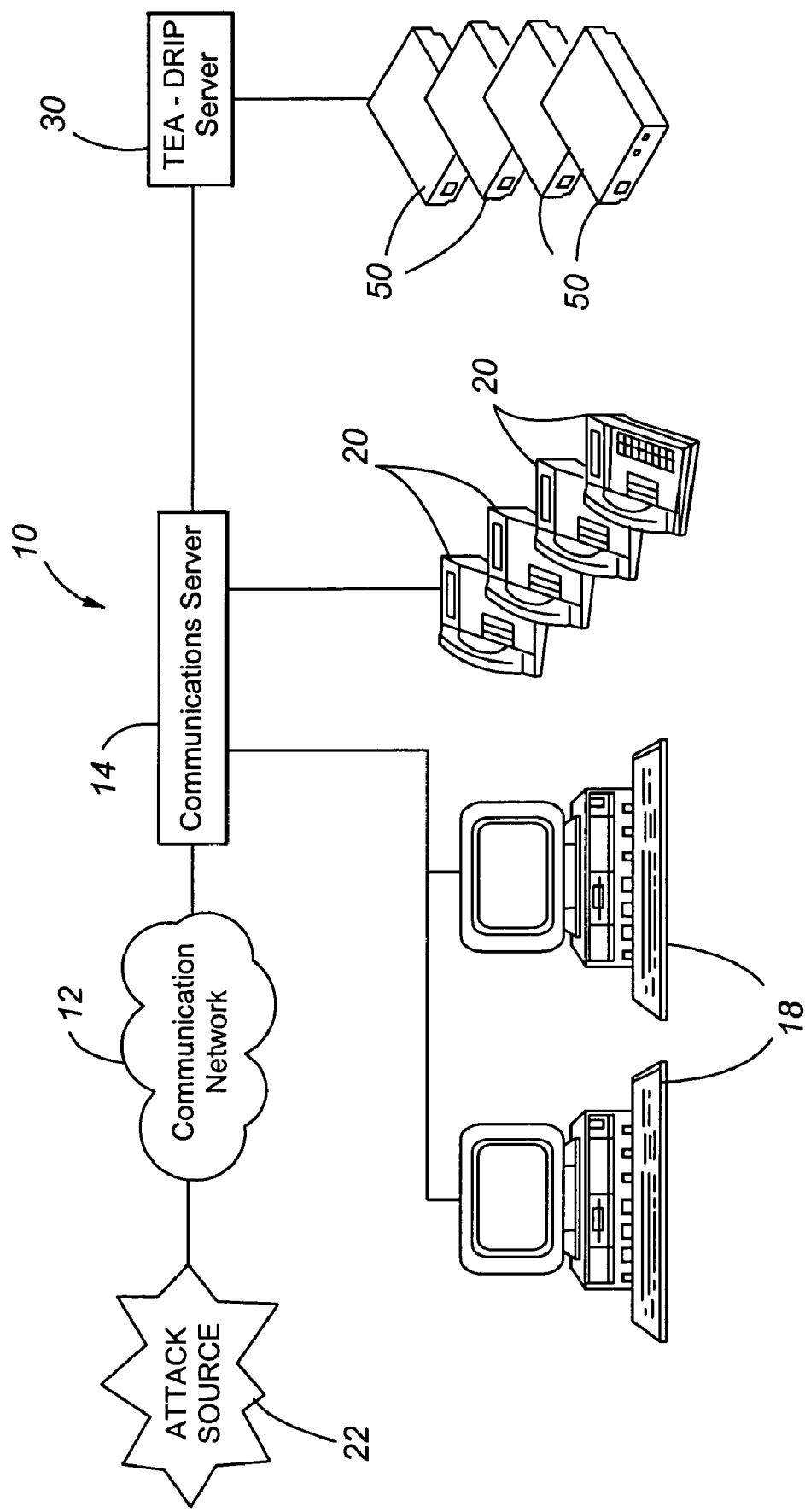
FIG. 4 is another schematic diagram depicting a telecommunication system incorporating the present invention in a third embodiment.

Referring to FIG. 4, another embodiment of the present invention is illustrated with respect to an exemplary communications system. In FIG. 4, the TEA-DRIP server 30 is located downstream of the communication server 14, and the server 30 only services selected communication devices of an enterprise, such as modems 50. Thus, it can be appreciated that the present invention can be selectively incorporated within only certain parts of the communications enterprise.

In order to set up a protocol or methodology for thwarting an attack in progress or preventing future attacks, the present invention provides a comprehensive analysis of call attributes, and then assigns a risk to each attribute. These attributes include the call source, call destination, media stream randomness, call duration, time of the call, call type, call volume, and call direction. For each call received, each of these attributes can be analyzed, or only selected ones of the attributes can be analyzed. For the call source, this includes a trunk ID, caller ID, and IP address (if a VoIP call). An attacker can easily spoof caller IDs or IP addresses, or both caller ID and IP addresses with more difficulty. However, it is even more difficult to spoof the trunk ID. The method and system of the present invention has the ability to detect spoofed caller IDs and IP addresses, particularly those spoofed IDs and addresses that claim to be from inside the enterprise, but originate from outside the enterprise. For example, any data packet arriving from the PSTN or from the ISP yet having an address that is from within the enterprise can be characterized as a spoofed ID or address. Alternatively, a lookup (or reverse lookup for SIP) can be conducted to determine whether the IP address and caller ID are spoofed. Another example of detecting spoofing includes detecting the same media stream being sent from multiple sources. As discussed further below, an analysis of media stream randomness concluding that the same media stream has been arriving from multiple sources indicates a high probability that the call is spoofed. For detecting a spoofed trunk ID, detection of this type of spoof in some cases can be achieved by analyzing the IP address and/or caller ID of a call. Additionally, if a dedicated trunk is provided for handling only specific call types, and the ANI (Automatic Number Identification) indicates the call type arriving over a different trunk, this indicates trunk spoofing. Depending upon how many of these three source attributes are spoofed, the alerting and prevention methods of the present invention may vary as discussed further below.

For the call destination attribute, the system of the present invention has the ability to detect when calls are made to sequential extension numbers, for example, 8000, 8001, 8002, etc. If an attacker calls a range of extensions including unadministered numbers/extensions, the number of times that unadministered numbers have been called can signify a possible attack since those numbers are not used for outgoing or incoming calls. An outgoing system message can identify unadministered numbers to an attacker versus those that are administered. Thus, war dialing can map the live numbers, including those that have voice mail, for later exploitation. In accordance with the present invention, an administrator can intentionally allocate and administer several unused/unpublished extension numbers for the purpose of trapping attack calls. These extensions may be referred to as "honey pot" extensions. Extension numbers other than voice, such as fax, modem or other call types, can also be used to monitor for attack calling. For example, if three extension numbers are administered outside of the published administered number range (such as administered honey pot numbers), and all three have calls within a short period of time, the suspicion or risk of an attack can be rated as high because the likelihood of receiving any calls on these unpublished extensions is extremely low.

For the media stream randomness attribute, since voice communications are statistically random in nature, it is extremely difficult and almost worthless to an attacker to replicate calls without recording and replaying them. Thus, the present invention can compare suspicious incoming media streams to previously received media streams to detect uniqueness. For privacy reasons, instead of recording an incoming media stream and comparing it to other incoming media streams, a hash may be built for suspect incoming streams and then compared. A hash can be defined as an algorithm or mathematical operation applied to an incoming stream, resulting in a value or range of values assigned to each received media stream. Hashes also save significantly in data storage space, and allow simple comparisons by simply comparing the values assigned.

For the call volume attribute, call volumes vary over a day, week, and months, but patterns emerge. If call volume is high, a war-dialing attack may be responsible for the excess volume.

For the call duration attribute, automated war dialing machines most often send prepared messages of very similar if not identical call durations. Thus, simply comparing call durations can also be a good measurement of call uniqueness for many extension attacks.

For the call time attribute, the time at which the call is received can be an indicator as to whether an attack has taken place. Particularly if an enterprise does not have 24-hour operations, calling times are well established. Calls made after hours are more suspect as attacks. After hour calls combined with other attributes can help establish if an attack is under way, or if normal after hour calls are being made.

For the call type attribute, this refers to whether the call is voice, modem, fax, or other. A sudden volume of unsolicited fax calls, for example, could signify an attack.

For the call direction attribute, the call direction will determine if the attack is generated from within the enterprise, for example, by an employee or perhaps by an attacker that has gained control of one or more telephony devices and is using them for attack purposes. Furthermore, if the attack is originating internally, the call destination and the time of day can be taken into consideration in detecting toll fraud attempts or other potentially illegal uses. For example, if a call is made after business hours to a toll number, toll fraud may be present. If the attack is generated from outside the enterprise, alternate alerting and prevention measures can be taken.

Once a possible attack has been detected, it is then possible to log the call attributes and to record the event by recording selected portions or the entire media stream. Attributes of an incoming call are analyzed, and a risk is associated with each of the attributes. An overall risk is then assigned or associated with the possible attack for purposes of determining whether or not to record the event, alert an administrator, and take remedial actions. The assigned overall risk can be determined in a number of ways that includes application of various algorithms or other mathematical relationships to the attack signature, that is, the data gathered on the potential attack. Additionally, calls can be analyzed on a group basis, that is, data can be gathered regarding the attributes of a group of calls within a particular time period, this group then being analyzed for a potential attack on the enterprise. One example of how risk associated with a call can be assigned is a simple three-tier classification system where attributes are identified as low, medium or high risk based on the presence of one or more attack attributes or characteristics. Another way in which potential attacks can be categorized in order to prompt the appropriate response or remedial action is simply by assigning numerical values to the specific attributes that are present in the attack signature, and then summing the values. If the values exceed a predetermined threshold value, then one or more remedial actions are triggered.

It shall be understood that the attributes analyzed for incoming calls can be associated with various risk levels according to the special needs of the particular enterprise attempting to thwart potential attacks. Additionally, there may be some types of call attributes that automatically result in generation of a high-risk assessment, and therefore prompt appropriate remedial actions to be taken. Over time, the present invention can be modified so that an enterprise can tailor risk assessment and remedial actions that best match the operation of the enterprise. One way in which call attribute risks can be modified is simply to provide user interface inputs that allow a user to change any values or algorithms assigned for determining risk levels, and to otherwise manipulate the gathered data regarding call attributes. Thus, the present invention clearly contemplates an "intelligent" system that has much greater flexibility as compared to rule-based systems wherein a user has no capability to modify risk assessment to trigger appropriate remedial actions. Of course all prescribed remedies can be sanitized by human interaction by modifying the remedy or choosing not to execute the remedy.

Once the call or group of calls have been assigned an overall classification or risk associated with the call(s), a determination is made as to whether any remedial action should take place. If there is a low risk associated with a particular call, then the preferred option may be to take no further action. The decision to take no further action means that the only action required is logging of the call attributes, but there are no other required actions. Thus, no alerts are issued and no remedial actions are recommended. If the risk level assigned to a particular call is not low, and rather is medium or high, then the event may be recorded, and/or a system administrator may be alerted as to the presence of the attack. The form in which the administrator can be alerted can include a voice mail message, an email message, or a call generated to the administrator's cell phone, among others. The communications device 18, 20, the communications server 14, and the TEA-DRIP server 30 can be designated to log call attributes and record the suspect call. Many telephony devices already have built-in capability to send a voice message, or to dial a cell phone or ring a pager automatically. The alert can be one or more pre-selected messages based upon the risk level or the sophistication level of the attack. Alerting can be done in real time, delayed time, or both, as best suits the particular enterprise. A history of identified attacks is useful in predicting future attacks, preventing future attacks and assisting law enforcement as necessary in tracking and tracing the attacks and the attackers.

Also, the call attributes can be conveyed to the administrator in the form of a table which sets forth each of the analyzed attributes, the assigned classification or risk associated with the call, as well as other conclusions that may be drawn from the gathered data. For example, in order to ease the administrator's burden in determining a potential remedial action to be taken, the message conveyed to the administrator could include one or more predetermined recommended remedial actions for the particular type of call that has been received. The administrator could then choose to either accept a recommended action, or modify it as necessary. The administrator could select one or more remedial actions via an interactive voice response (IVR) application that is incorporated in the communication server. If the administrator was alerted and had access to a system computer, the administrator could select a course of action on a user interface screen that is generated within the alert. The selection would then cause the system to effect the response by taking the remedial action, for example, disconnecting one or more communication devices. The IVR function should require a feature access code (FAC) or password to keep IVR access secure from attackers who might otherwise take control of the communication systems by attacking the IVR.

After an event has been logged and/or recorded and an administrator has been alerted, the appropriate remedial action is taken to prevent continuance of the attack, and to prevent future attacks. Remedial actions can have three general forms, namely, manual, automatic and auto assisted manual. The manual remedial action can be described as a manual effort, such as by the system administrator, to lockdown or isolate the communication system or the targeted part of the system in order to prevent an ongoing attack. Manual actions can include disconnecting a particular communication device from the system, changing a class of restriction, and changing extension numbers/addresses.

For an automatic remedial action, the system can be programmed to generate a response to the perceived attack that may also include the disconnection of one or more communication devices from the system, etc. Automatic remedial actions can be triggered based upon the presence of a unique set of call attribute characteristics or numerical values assigned to the call. The present invention also contemplates an administrator being able to tailor these automatic remedial actions based upon historical analysis (logging) and other unique factors peculiar to a specific enterprise.

The auto assisted manual remedial action capability refers to the concept of blending both manual and automatic remedial actions. One example of a situation in which this type of remedial action provides enhanced functionality is if the next day is Mother's Day, and the enterprise is a floral delivery company that becomes flooded with off-hour orders the night before. An abnormal number of off-hour calls might normally trigger an inappropriate automatic response, for example, shutting down one or more communication devices. Clearly, this would be a disastrous remedial action to be taken since many customers would be denied access to order flowers for the next day. Accordingly, the administrator should decide to take no action knowing that this particular evening will have many more off-hour calls.

Other specific examples of remedial actions that can be taken to prevent an attack, or to at least further analyze a potential attack, include (i) recording an event but not taking prevention measures; (ii) responding to a SPAM caller with a prerecorded warning message to discourage future calls; (iii) forwarding the suspect call to an operator for help or other analysis by the local or long distance provider; (iv) rate limiting calls from the source of the attack to prevent denial of service attacks. (Ideally, the rate is limited to a random interval to prevent an attacker from adjusting their attack rate to match the rate limit); (v) terminating calls from the source of the attack. (Faxed SPAM is an example of calls that should not connect to a fax machine); (vi) preventing future calls from the source of attack by temporarily blocking all calls from one source for a period of time. (This course of action can be potentially undesirable since it could allow an attacker to cause a denial of service by spoofing the source of the attack; however, the blocking measure could be taken only for selected predetermined times, and for pre-selected call sources such as particularly suspect telephone numbers or IP addresses); (vii) recording a call for manual analysis or for call tracing; and (viii) requesting a telephone number/IP address for callback. (This last measure protects the enterprise from at least a spoofed extension number).

Figure 5A:
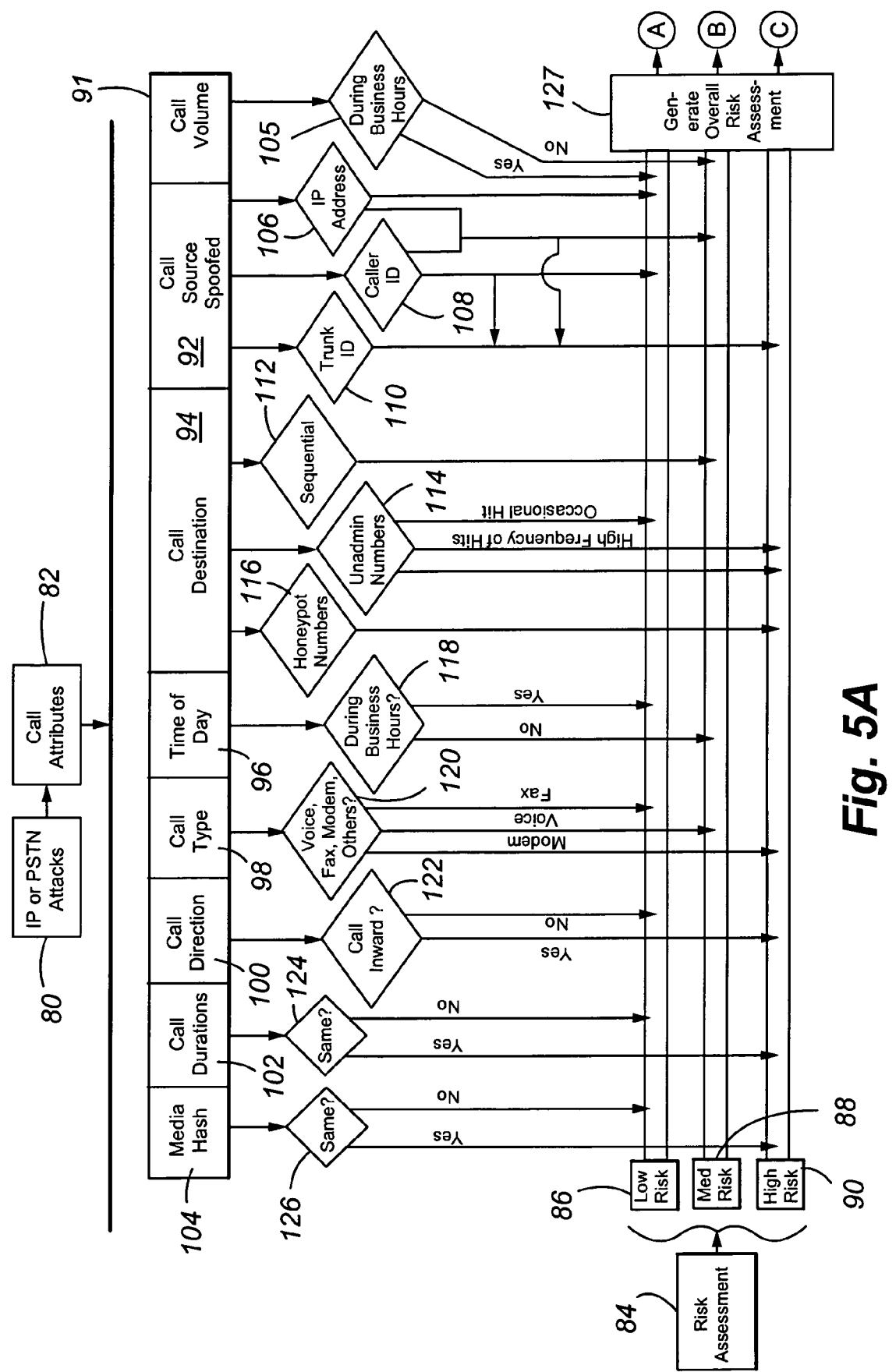
FIGS. 5A and 5B illustrate one example implementation of the operation of the present invention.
Figure 5B:
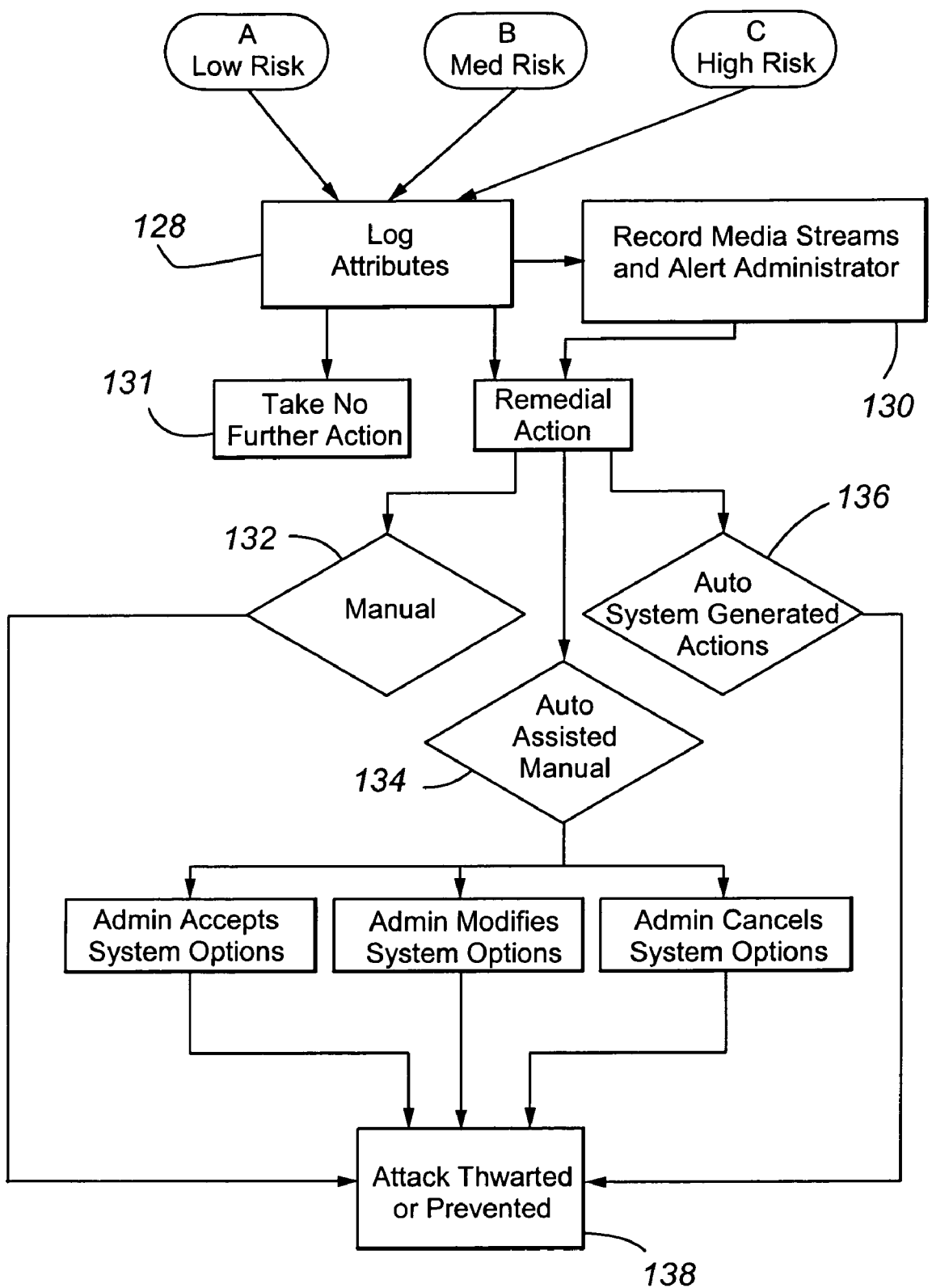

FIGS. 5A and 5B illustrate one example of implementation of the functionality associated with the present invention to include (i) analyzing the attributes of a call, (ii) assessing a risk for the call attributes, (iii) recording the event, (iv) alerting an administrator, and (v) taking a remedial action. As shown in FIG. 5A, a call is generated as an IP or PSTN attack 80. A number of attributes 82 of the call are then analyzed. After the attributes are analyzed, a risk assessment 84 is assigned to the call attributes. In accordance with the example in FIG. 5A, a low risk 86, a medium risk 88, or a high risk 90 is assigned for each measured or evaluated characteristic of a call attribute. Returning to the various call attributes 82, the analyzed attributes may include the number of calls (volume) 91 from a source, a spoofed call source 92, the call destination 94, the time of day 96, the type of call 98, the call direction 100, the call duration 102, and the value of the media hash 104. As discussed, the value of the media hash can be determined by an algorithm applied to the incoming media stream. Returning to the call volume 91, one way in which to assign risk is to analyze the number of calls occurring either during or after business hours. In the example, referring to block 105, if an unexpected number of calls are received from a source during business hours, then a low risk is assigned while a medium risk is assigned if the unexpected number of calls are received after business hours. For the call source spoofed attribute 92, if the IP address 106 is spoofed, a low risk is assigned. If the caller ID 108 is spoofed, a low risk is assigned. However, if the IP address and caller ID are both spoofed, a medium risk is assigned. If the trunk ID 110 is spoofed, a high risk is assigned. If the trunk ID and any other ID are spoofed, a high risk is still assigned. For the call destination attribute 94, if a sequential call destination 112 is present (for example sequential extension numbers dialed) a medium risk is assigned. For unadministered numbers 114, occasional calls or "hits" to those numbers constitute a low risk whereas a high frequency of calls to those number represent a high risk. For unadministered numbers 116 (those numbers which are deliberately unassigned and are closely monitored), calls made to these honeypot numbers represent a high risk. For the time of day attribute 96, calls are analyzed as to being received during business versus non-business hours at block 118. If the calls are made during business hours, then a low risk is assigned whereas if calls are made outside of business hours, then a medium risk is assigned. For the call type attribute 98, as shown at block 120, the call is classified as to whether the call is voice, fax, modem, or other. Modem calls can be generally characterized as high risk as compared to voice calls that are generally characterized as medium risk and other calls such as fax calls may be generally characterized as low risk. For the call direction attribute 100, at block 122, call directions are analyzed. Call inward direction calls are those calls that are made from extensions within the communications enterprise while call outward direction calls are those that originate from outside the enterprise. If a call inward direction exists, then a high risk is assigned whereas call outward directions are assigned a low risk. For the call durations attribute 102, the call durations are analyzed at block 124. If the call durations between compared calls are the same, then a high risk is assigned, whereas multiple call durations are assigned a low risk. Exceptions can apply as in the case of an out-bound call center where a pre-recorded message results in same call durations. For the media hash attribute 104, at block 126, if the media hash values are the same between compared calls, then a high risk is associated with that event whereas if the media hash values are not the same, then a low risk is assigned to the event. Based upon a single attribute of a call or a combination of attributes of a call, to include any number of rules that can be applied to attributes of a particular call, an overall risk assessment 127 is determined.

Referring to FIG. 5B, a low overall risk assessment results in logging the selected call attributes at block 128. Depending upon the attributes detected, one of three options are provided, namely (i) record the media stream and alert the administrator at block 130 (such as by email, page, or cell phone call), (ii) directly take the recommended remedial action, or (iii) simply take no further action as shown at block 131. If an overall medium risk is assigned, the selected call attributes are logged, the administrator is alerted, the media stream is recorded, then the appropriate remedial action is taken which could include no further action. If a high risk is associated with a particular call, then the selected call attributes are logged, the media stream is recorded, the administrator is notified, and the appropriate remedial action is then taken. For a high-risk scenario, it would be unusual not to take some remedial action. As also shown in FIG. 5B, three general options are provided for remedial actions to be taken including a manual response 132, an auto-assisted manual response 134, and an automatic response 136. For the auto-assisted option 134, the administrator can accept the system-provided option(s), cancel the system-provided option(s), or modify the system-provided option(s). Finally, at block 138, the attack has been thwarted or prevented.

In another aspect of the present invention, it is contemplated that only selected calls are analyzed as potential attacks. For example, voice calls having an outward direction during business hours could be deleted from the sample of calls that are analyzed since these types of calls generally have a low risk as being initiated from an attacker.

In yet another aspect of the present invention, once a confirmed attack has occurred and the attack source is identified, future calls made from the same attack source can result in bypassing attribute analysis and risk assessment and causing a remedial action to take place or be recommended. Accordingly, a "black list" can be developed for each and every IP address or telephone number that has in the past been proven to be the source of an attack. In this circumstance, the remedial action taken can also include automatically recording some portion or the entire media stream and then terminating the call. Historical data in the form of the logged attributes can be maintained for all attacks, and bypass instructions can be provided for immediately thwarting or preventing an attack from those same addresses/numbers.

There are many advantages to the method and system of the present invention. By analyzing multiple attributes of an incoming call, great flexibility is provided for generating an appropriate remedial action based upon risk assessment. The risk assessment is not a static assessment; rather, an administrator may adjust the risk assessment over time by manipulating rules that determine whether the attributes should constitute a specific risk level. The detailed attribute analysis along with the adaptable risk assessment provides for an "intelligent" model that can be tailored to a specific enterprise in order to best thwart or prevent extension attacks. The creation of media hashes allows the present invention to evaluate media streams, and to record only the media hash values as opposed to the entire media stream, thereby saving available memory space in the system, as well as to prevent inadvertent privacy violations by otherwise recording the actual media stream.

Although the present invention has been illustrated with respect to preferred embodiments thereof, it shall be understood that various other changes and modifications can be made to the present invention within the scope of the claims appended hereto.

What is claimed is:

1. A method of protecting communication services of a communication enterprise, said method comprising the steps of:

detecting, by a processor, a perceived extension attack in the form of a call directed to one or more extensions within the communication enterprise, said detecting including analyzing at least one attribute of the call;

classifying, by a processor, a risk associated with the call based upon the analysis of the at least one attribute;

taking, by a processor, a remedial action to thwart the perceived attack according to the risk associated with the call: and said detecting by a processor comprises (i) creating an algorithm, (ii) applying the algorithm to a first media stream of the call, (iii) generating a first media hash value reflective of the first media stream content, (iv) applying the algorithm to a second media stream of a subsequent call directed to the communications enterprise, (v) generating a second media hash value reflective of the second media stream, (vi) comparing the first and second hash values, and (vii) taking the remedial action if the first and second hash values fall within a pre-designated range.

2. A method, as claimed in claim 1, further including the steps of:

recording the call; and alerting an administrator of the communication enterprise of a type and risk associated with the call enabling the administrator to influence the remedial action taken.

3. A method, as claimed in claim 1, wherein:

said detecting comprises detecting a spoofed call source by comparing a source ID attribute of the spoofed call to an actual call source ID wherein a look-up or reverse look-up is conducted to determine the actual call source.

4. A method, as claimed in claim 1, wherein:

said detecting comprises analyzing call sequences sent from a call source to the enterprise, and taking the remedial action if the call sequences match a predetermined objectionable call sequence.

5. A method, as claimed in claim 1, wherein:

said detecting comprises detecting calls sent to unadministered numbers in the enterprise, and taking the remedial action if the number of calls to the unadministered numbers reach an objectionable predetermined value.

6. A method, as claimed in claim 1, wherein:

said detecting step comprises analyzing the time of day when calls are sent from a call source, and taking the remedial action if the number of calls received after normal hours of operation exceed a predetermined number of calls.

7. A method, as claimed in claim 1, wherein:

said detecting comprises analyzing a call source, and determining whether the called source is fax, voice or modem.

8. A method, as claimed in claim 1, wherein:

said detecting comprises determining whether a call is made from an extension within the enterprise.

9. A method, as claimed in claim 1, wherein:

said detecting comprises detecting whether a plurality of calls from a call source have single or multiple durations.

10. A method, as claimed in claim 1, wherein:

said detecting comprises detecting the number of calls received from a call source and determining whether the number of calls received comprises an objectionable number of calls.

11. A communication system, comprising:

a communication server interconnected to a communication network, said communication server receiving communications through the network from at least one attack source;

a first communication device having an address, and receiving communications from said network through said communication server; and an extension attack prevention application associated with said communication server, wherein said application analyzes call attributes of a call, assigns a risk associated with the call, and proposes a remedial action to thwart a perceived attack when said assigned risk fulfills criteria for a predetermined remedial action, said extension attack prevention application comprising an algorithm applied to a first media stream of the call to generate a first media hash value, and applying the algorithm to a second media stream of a subsequent call to generate a second media hash value, and means for comparing the first and second hash values for taking a remedial action if the first and second hash values fall within a pre-designated range.

12. A system, as claimed in claim 11, wherein:

said extension attack prevention application detects a spoofed call source by comparing a source of the spoofed call to an actual call source wherein a look-up or reverse lookup is conducted to determine the actual call source.

13. A system, as claimed in claim 11, wherein:

said extension attack prevention application includes at least one rule applied to attributes of the call analyzed for being an extension attack, said attributes including at least one of a call duration, a call direction, a call type, a time of day, a call destination, a spoofed call source, and a number of calls received from a call source of the call, said rule being associated with determining whether to take the remedial action.

14. A system, as claimed in claim 11, wherein:

said extension attack prevention application assesses an overall risk associated with the call, said assessment comprises an analysis of a plurality of attributes of the call, said attributes including at least one of a media hash value, a call duration, a call direction, a call type, a time of day, a call destination, a spoofed call source, and a number of calls received from a call source of the call.

15. A system, as claimed in claim 14, wherein:

said assessment includes a computation applied to at least one of said call attributes, and assigning a risk associated with at least one analyzed call attribute.

16. A system, as claimed in claim 11, wherein:

said extension attack prevention application notifies an administrator of the communication system of the perceived attack and an assigned risk associated with the attack thereby enabling the administrator to intervene the remedial action taken.

17. A system, as claimed in claim 11, wherein:
said extension attack prevention application includes executable programming instructions incorporated within said communication server, at least one database associated with said programming instructions, wherein said programming instructions are modified over time to alter the assignment of risks associated with attacks based at least in part on historical analysis of previously occurring extension attacks.

18. A system, as claimed in claim 16, wherein:
said application includes an interactive voice response application incorporated in said communication server wherein the administrator is provided multiple options in generating an appropriate remedial action by selecting a remedial action option.

19. An apparatus for protecting communication resources of a communication enterprise, said apparatus comprising:
a processor;
programming instructions executed by said processor, said programming instructions including an extension attack prevention application wherein said application detects attributes of a suspect call, logs the attributes, assigns a risk to each of a plurality of the attributes associated with the suspect call, and provides recommendations for remedial actions to be taken to thwart a perceived attack;
a processor readable memory associated with execution of the programming instructions, and for storage of data and said programming instructions;
at least one input device for manipulating said programming instructions, and for interfacing with outputs generated from said device in response to perceived attacks; and
wherein said attributes include a media hash value and a spoofed call source.

20. A system for protecting communication resources of a communication enterprise, said system comprising:
a communication server for interfacing with a communication network, said communication server receiving and routing incoming communications, and facilitating transmission of communications with respect to addressed communication devices;
means incorporated within said communication server for protecting the communication resources from extension attacks sent by one or more attack sources through the communication network, said means for protecting including:
(i) means for detecting an extension attack;
(ii) means for assigning a risk associated with the attack;
(iii) means for taking a remedial action based on the assigned risk to thwart the attack; and
(iv) said means for detecting comprises (i) creating an algorithm, (ii) applying the algorithm to a first media stream of the call, (iii) generating a first media hash value reflective of the first media stream content, (iv) applying the algorithm to a second media stream of a subsequent call directed to the communications enterprise, (v) generating a second media hash value reflective of the second media stream and (vi) comparing the first and second hash values.

21. A system, as claimed in claim 20, wherein:
said means for detecting includes detecting a spoofed call source by comparing a source of the spoofed call to an actual call source, wherein a reverse lookup is conducted to determine the actual call source.

22. A system, as claimed in claim 20, wherein:
said means for detecting comprises analyzing call sequences sent from a call source to the enterprise, and taking the remedial action if the call sequences match a predetermined objectionable call sequence.

23. A system, as claimed in claim 20, wherein:
said means for detecting comprises detecting calls sent to unadministered numbers in the enterprise, and taking the remedial action if the number of calls to the unadministered numbers reach an objectionable predetermined value.

24. A system, as claimed in claim 20, wherein:
said means for detecting comprises analyzing the time of day when calls are sent from a call source, and taking the remedial action if the number of calls received after normal hours of operation exceed a predetermined number of calls.

25. A system, as claimed in claim 20, wherein:
said means for detecting comprises analyzing a call source, and determining whether the call source is fax, voice or modem.

26. A system, as claimed in claim 20, wherein:
said means for detecting comprises determining whether a call is made from an extension within the enterprise.

27. A system, as claimed in claim 20, wherein:
said means for detecting comprises detecting whether a plurality of calls from a call source have a single or multiple durations.

28. A system, as claimed in claim 20, wherein:
said means for protecting includes executable programming instructions incorporated within said communication server at least when data base associated with said programming instructions, wherein said programming instructions are modified over time to alter the assignment of risks associated with attacks based at least in part on historical analysis of previously occurring extension attacks.

29. The apparatus as claimed in claim 19, wherein:
said programming instructions:
  (i) creates an algorithm,
  (ii) applies the algorithm to a first media stream of the suspect call,
  (iii) generates a first media hash value reflective of the first media stream content,
  (iv) applies the algorithm to a second media stream of a subsequent suspect call directed to the communications enterprise,
  (iv) generates a second media hash value reflective of the second media stream,
  (v) compares the first and second hash values, and
  (vi) causes implementation of a selected remedial action when the first and second hash values fall within a pre-designated range.

* * * * *

UNITED STATES PATENT AND TRADEMARK OFFICE
CERTIFICATE OF CORRECTION

PATENT NO.         : 7,653,188 B2                                               Page 1 of 1
APPLICATION NO. : 11/243753
DATED              : January 26, 2010
INVENTOR(S)        : Kloberdans et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Twenty-third Day of November, 2010

David J. Kappos
*Director of the United States Patent and Trademark Office*